United States Patent

Mirtain

[11] 4,120,338
[45] Oct. 17, 1978

[54] PNEUMATIC TIRE HAVING AN IMPROVED HEEL STRUCTURE

[76] Inventor: Henri J. Mirtain, 35, Avenue de la Somme, Compiegne, France

[21] Appl. No.: 729,456

[22] Filed: Oct. 4, 1976

[51] Int. Cl.² ............................................. B60C 15/04
[52] U.S. Cl. ............................ 152/354 R; 152/362 R; 152/374
[58] Field of Search ............. 152/362 R, 362 CS, 354, 152/357, 374

[56] References Cited

U.S. PATENT DOCUMENTS

| 3,013,599 | 12/1961 | Riggs | 152/362 R |
|---|---|---|---|
| 3,339,610 | 9/1967 | Fausti et al. | 152/354 |
| 3,682,223 | 8/1972 | Simpson | 152/362 R |
| 3,722,568 | 3/1973 | Maiocchi | 152/362 CS |
| 3,736,973 | 6/1973 | Mezzanotte et al. | 152/362 R |
| 3,911,987 | 10/1975 | Takasagawa et al. | 152/354 |

*Primary Examiner*—Robert G. Sheridan
*Assistant Examiner*—Donald W. Underwood
*Attorney, Agent, or Firm*—Philip Rodman

[57] ABSTRACT

A pneumatic tire having an improved heel structure includes a two element rubber filler assembly extending from a bead core toward the tread, generally decreasing in thickness in a direction away from the bead core. One of the filler elements is reinforced rubber having a Shore A hardness between 85°–93° whereas the other filler element, in mutual contact with the first, is nonreinforced rubber having a Shore A hardness between 70° to 95°. The contact surface between the two filler elements forms an oblique angle with the equatorial plane of the tire.

15 Claims, 7 Drawing Figures

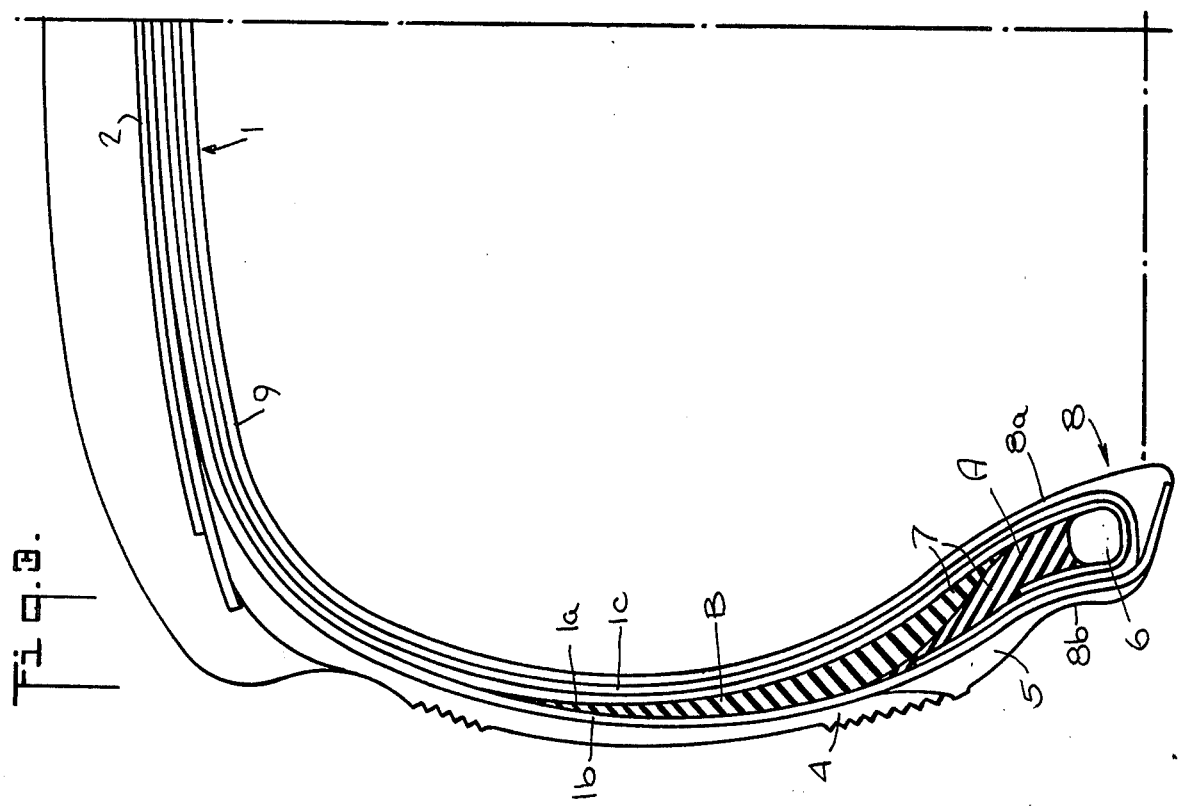
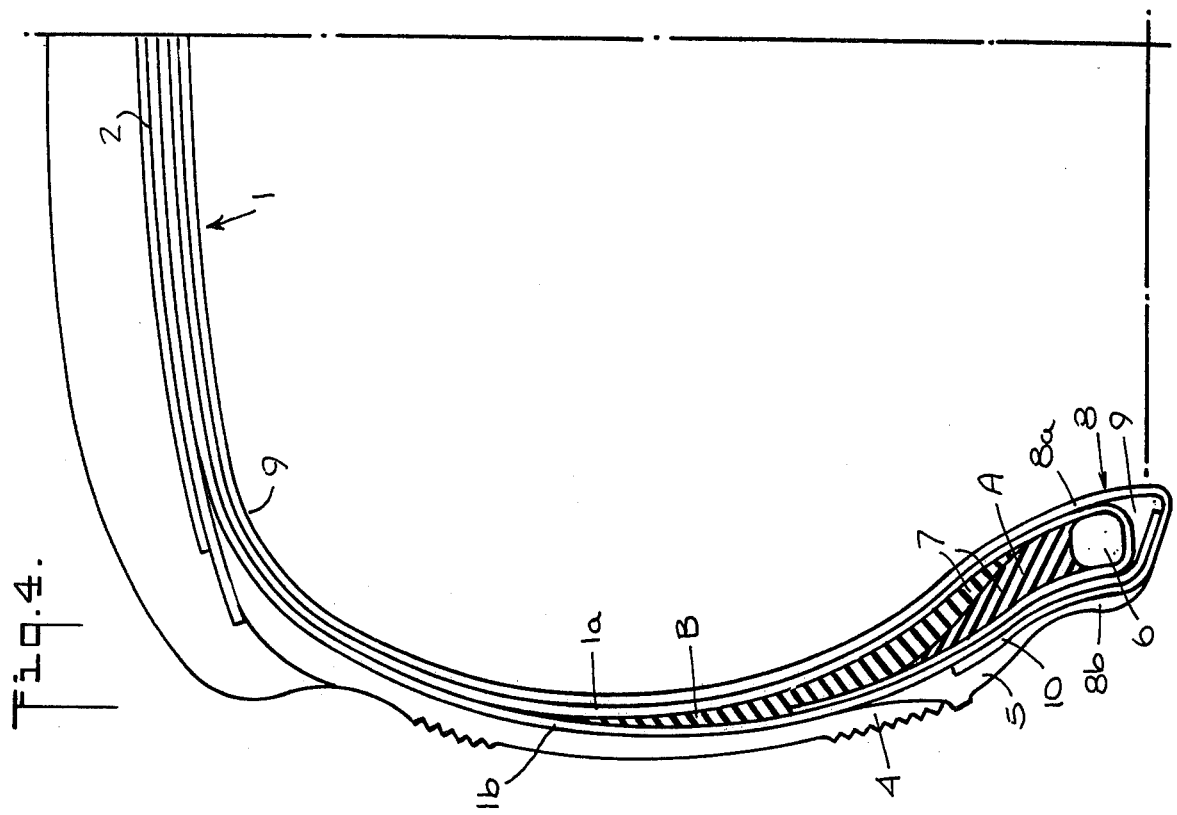

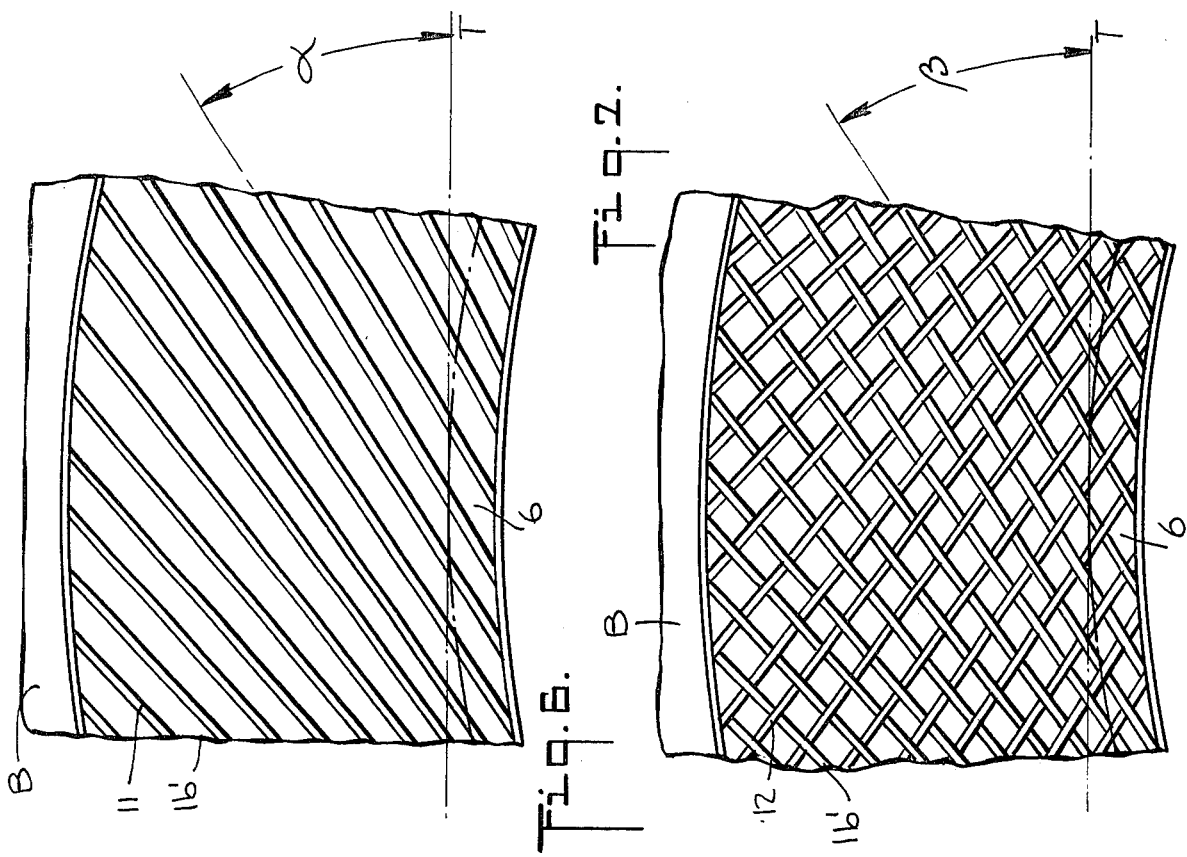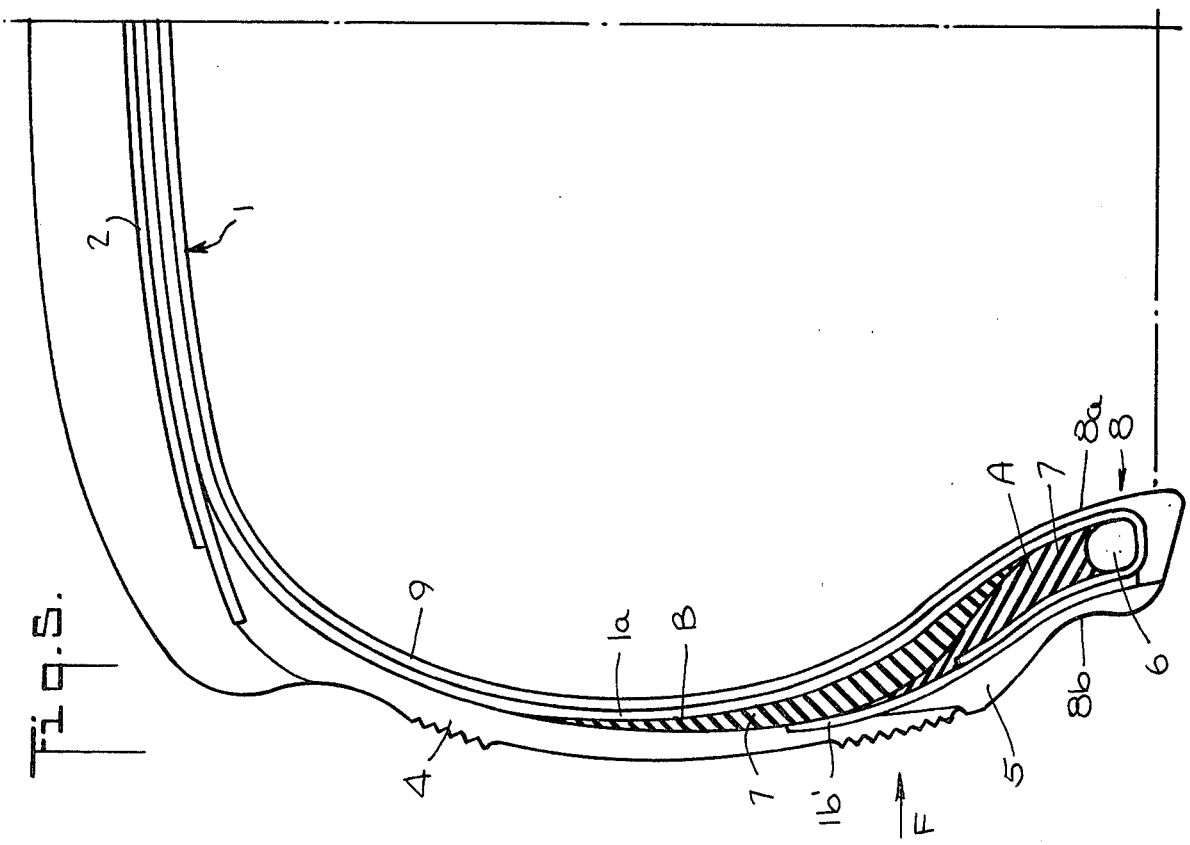

PNEUMATIC TIRE HAVING AN IMPROVED HEEL STRUCTURE

The present invention relates to pneumatic tires and more specifically to an improvement in the heel structure of pneumatic tires.

Each heel zone of a pneumatic tire usually comprises a generally tapered filling element such as an apex strip of rubber in contact with a bead rod and disposed between a main portion of the carcass and a folded over and turned up portion of one or more carcass plies.

It has previously been recommended to use two types of rubber constituting two superpositioned cores to form the rubber filler element, one rubber core having a Shore A hardness of the order of 85° and one rubber core having a Shore A hardness of the order of 60°. In this manner the heel can be arranged to preserve rigidity in the area of the rods, while maintaining vertical flexibility in the sidewall areas to provide comfort qualities. However it has been found that the pneumatic tires with this type of heel arrangement do not adequately withstand the deformations parallel to the equatorial plane brought about by a vertical flattening. Moreover the longitudinal as well as crosswise rigidity of the heel areas in a tire having this type of heel arrangement are subject to separations, degradations or other types of breakdowns after relatively short periods of operation.

It is thus desirable to provide a pneumatic tire having a heel structure that can adequately withstand deformations without sacrificing comfort.

A primary objective of the present invention is to provide a novel tire construction wherein the heel area has high longitudinal and crosswise rigidity to withstand the force effects caused by braking, accelerating and lateral skid yet exhibits sufficient flexibility to ensure passenger comfort. Other objects and features will be in part apparent and in part pointed out hereinafter.

The pneumatic tire in accordance with the present invention includes a rubber filler element at each heel that comprises a first element, having a Shore A hardness of the order of 85° to 93°, in contact with the bead rod and formed with textile or metallic fibers or fiberglass. A second element made of pure rubber having a Shore A hardness of the order of 70° to 95°, preferably in contact with the first element is at a greater radial distance from the bead rod than the first element. Preferably the two elements contact one another at an oblique angle with the equatorial plane of the tire.

In order to provide improved resistance to deformation under the effect of lateral stresses and an improved resistance to ply separation, especially in carcass plies the first and second heel elements are preferably enclosed between at least two carcass plies. This is accomplished by arranging at least one carcass ply to pass along the inside of the heel with a turned up portion along the outside thereof, and another carcass ply is arranged to pass along the outside of the heel with a turned up portion toward the inside thereof.

In specific embodiments of the invention, the carcass ply passing along the outside of the heels is an enveloping ply surrounding, at least partially in the heel areas, a ply passing along the inside of the heels. The enveloping ply is covered at the level of the beads by bead chafer strips folded toward the insides of the heels over the edges of a liner ply that covers the inside of the carcass plies.

The invention, in another embodiment, incorporates a single carcass ply comprised of high tensile strength stranded cables having very low elongation such as cables known under the designation Kevlar in which for example a design of the type 1100/2 dtex has a breaking strength of the order of 33.0 kilograms. An identical design involving polyester has a breaking strength of only 15 kilograms whereas the breaking strength is less than 10 kilograms in the case of rayon.

The invention accordingly comprises the constructions hereinafter described, the scope of the invention being indicated in the following claims.

In the accompanying drawings in which various embodiments of the invention are illustrated:

FIGS. 2–5 are views similar to that of FIG. 1 showing other embodiments of the invention; and FIGS. 6 and 7 are fragmentary broken views along the direction F of FIG. 5.

Figure 1:
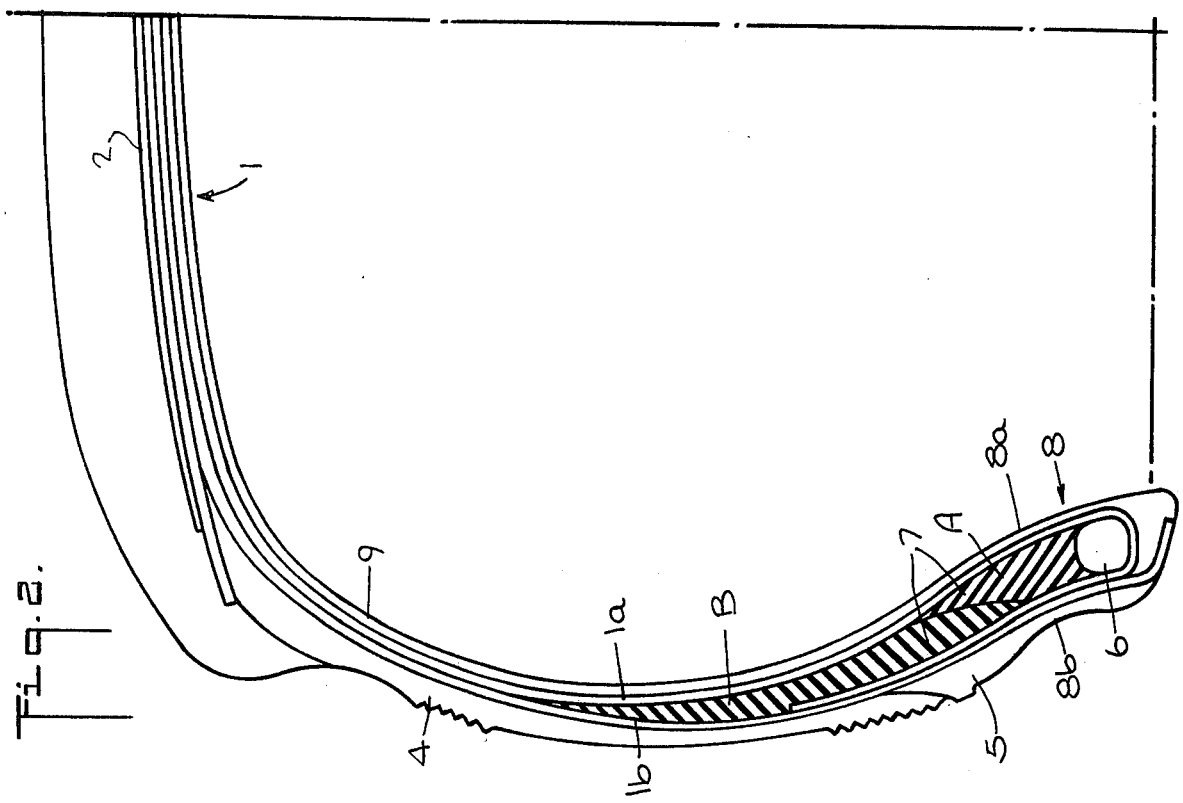
FIG. 1 shows the left half of a pneumatic tire in radial cross section incorporating one embodiment of the present invention.

Referring now to the drawings the pneumatic tire, particularly that illustrated in FIGS. 1 to 4, comprises a carcass 1 formed of a plurality of plies such as 1a, 1b, and, in conventional arrangement, a reinforcement belt 2, a tread 3, sidewalls 4, chafer strips 5, and bead cores 6. A rubber filler element 7, formed of elements A and B, is peripherally surrounded by the plies 1a and 1b at each heel 8. The reference 8a designates the inner side of the heel 8, and the reference 8b the outer side of said heel.

The element A, which has a Shore A hardness of the order of 85° to 93° is made of rubber reinforced with textile or metallic fibers and/or glass fibers. Preferably the textile fibers of the element A are made of a material that is a derivative of cellulose, such as for example rayon, or a petroleum derivative namely a polyamide such as nylon, or a material known under the trademark designation Kevlar, or fiberglass.

The element B having a Shore A hardness of the order of 70° to 95° is made of pure rubber. The elements A and B are in mutual contact with one another. The contact surface between the elements A and B forms an oblique angle between 30° and 60° with the equatorial plane of the tire.

In FIG. 1 $m$ defines the distance from the radially internal edge of the heel to the most external portion of the first element A, $n$ defines the distance from the radially internal edge of the heel to the most externally situated portion of the second element B, and H defines the distance from the radially internal edge of the heel to the area of the inner surface of the carcass that is radially at a maximum distance from the tire axis.

It has been found that the tire performs in an optimum manner when the two filler elements A and B of the heel 8 have the following relationships:

$$0.15 < m/H < 0.35 \tag{1}$$

$$0.35 < n/H < 0.95 \tag{2}$$

However it is most preferable that the $m/H$ and $n/H$ ratios be represented by the following formulas:

$$0.22 < m/H < 0.28 \tag{3}$$

$$0.62 < n/H < 0.68 \tag{4}$$

In FIG. 1 the values selected for the parameters m, n and H are such that the ratios and relationships (1) and (2) defined above are complied with.

The filler elements A and B tend to taper off in the direction of the tread. In addition, the element B is joined to the element A along a portion that tends to taper off in the direction of the rod 6. Consequently at a crosswise level $x - y$ of the tire the two elements A and B are present simultaneously.

The carcass ply 1a is a reinforced ply that passes along the inner side 8a of the heel and is folded over and turned up along the outside 8b of the heel. The carcass ply 1b, which is likewise reinforced, passes along the outside 8b of the heel, covers the turned up portion of the ply 1a and is partially folded and turned up around the bead 6. A liner 9 made of non-reinforced rubber is at the innermost side of the inner side 8a.

Figure 2:
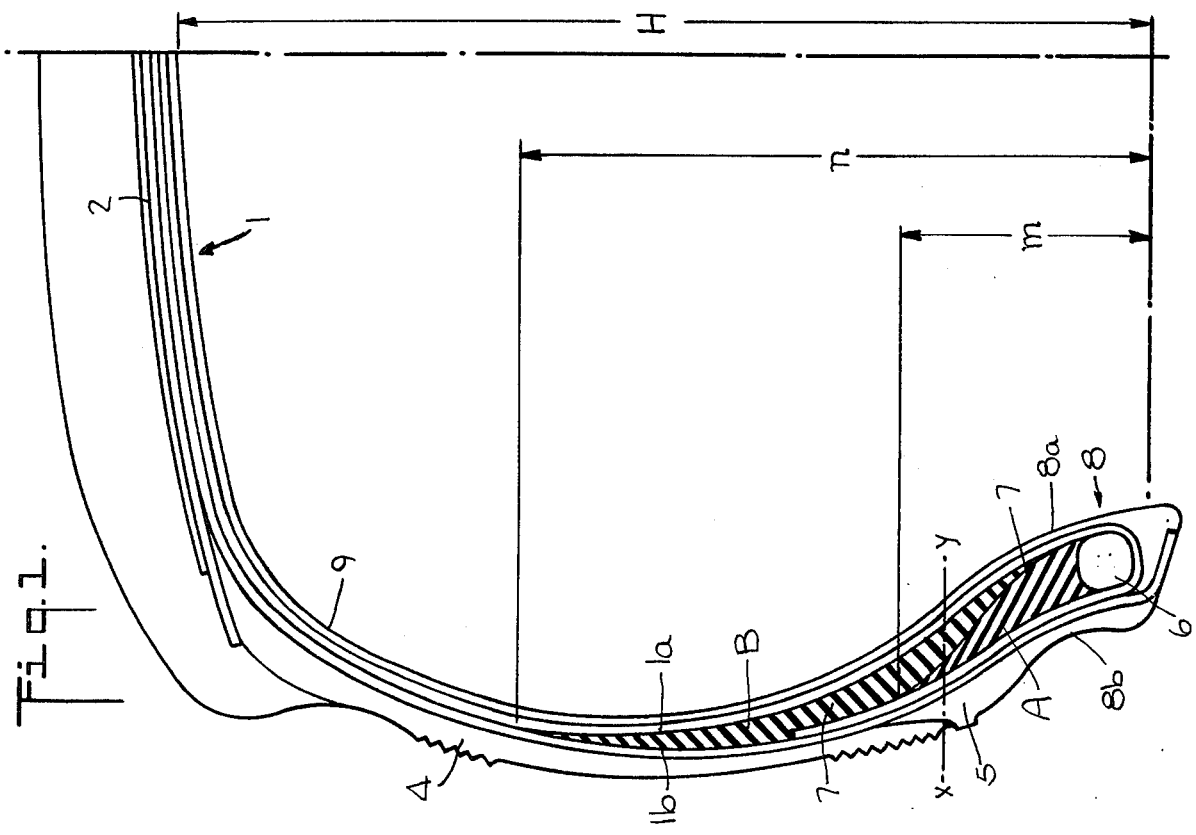

The embodiment of FIG. 2 differs from that of FIG. 1 by provision of the first element A along the inside of the second element B.

The embodiment of FIG. 3 differs from that of FIG. 1 by provision of the carcass 1 as three reinforced webs or plies 1a, 1b and 1c, the plies 1a and 1b being similar to the plies 1a and 1b of FIG. 1. The ply 1c passes along the inside 8a of the heel with the ply 1a and is turned up along the outside of the heel while covering the ply 1a. The ply 1c also extends slightly beyond the free extremity of the ply 1a. As in the previous embodiments the ply 1b constitutes a wrapping ply.

The embodiment of FIG. 4 differs from that of FIG. 1 by provision of chafer strips 10 folded over the outside of the heels including edges 9' of the liner 9.

In the embodiment of FIG. 5 the ply element 1b' replaces the ply 1b of FIG. 1 thereby providing a more economical structure since a reduced amount of fabric is used. The single reinforced ply 1a, which includes Kevlar textile strands for example, is covered by the reinforced ply element 1b' along the turned up portion of the ply 1a at the outside of the heel. The ply element 1b' includes strands 11, formed of fabric, textile or metallic cables, oriented at an angle of about 15° to about 60° with respect to the tangent T at the rod 6 as shown in FIG. 6. Suitable textile cable material can be nylon, rayon, polyester, glass or Kevlar material. Excellent results were achieved with nylon. The ply element 1b' can be made for example by using a reinforced fabric made out of a warp and weft nylon fabric 12 cut at an angle beta ($\beta$) of approximately 45° with a line T tangent to the bead core 6 as shown in FIG. 7.

Some advantages of the present invention evident from the foregoing description are a pneumatic tire having a heel with superpositioned core elements having relatively high Shore A hardnesses. The first element, with a Shore A hardness of 85°–93°, exhibits exceptionally high longitudinal and crosswise rigidity that enables the heel to withstand torque effects caused by braking and accelerating. The high crosswise rigidity is also beneficial in overcoming the effects of lateral skid. The relatively high hardness of the second element enables it to likewise compensate for braking and skidding effects to a lesser degree than the first element. The use of a pure rubber composition for the second element, having a Shore A hardness in the order of 70° to 95°, provides both a certain flexibility or vertical suppleness that aids in providing comfort and at the same time, an excellent resistance to deformation by vertical flattening due to the excellent fatigue strength of this type of rubber.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic tire having, in cross-section, an inner wall portion and an outer wall portion, a bead core disposed between said inner and outer wall portions, a carcass disposed between said inner and outer wall portions, a tread defining a tread region and forming a crown-like cover on the carcass, and a rubber filler assembly disposed between said inner and outer wall portions, said filler assembly having a base portion at the bead core and extending toward the tread between said inner and outer wall portions, said filler assembly including an inner and outer wall portion corresponding to the inner and outer wall portions of said tire and being of generally decreasing thickness from said bead core as it extends toward said tread and having not more than two filler elements consisting of a first element of reinforced stranded rubber with a Shore A hardness in the order of 85° to 93° and a second element of nonreinforced rubber with a Shore A hardness in the order of 70° to 95°, the first and second elements being in mutual contact at an oblique angle with the equatorial plane of the tire, such that said first element incorporates all of said base portion and is of generally decreasing thickness in a direction from the bead core toward the tread, and said second element is disposed remote from said bead core and is of generally increasing thickness in said direction up to a point of maximum thickness and then of generally decreasing thickness in said direction to a terminal point at a predetermined distance from said bead core, said carcass having a first ply portion passing from said tread region along the inner wall side of said rubber filler assembly in substantially continuous contact with the inner wall side of said rubber filler assembly from the terminal point of said second element to the base portion of said first element and is folded about the bead core to form a turnup at the outer wall portion of said filler assembly extending toward said tread, and terminating before the terminal point of said second element said turnup being in substantially continuous contact with the outer wall portion of said filler assembly, said tire further including a second ply having a portion overlapping the outer wall of said filler assembly between said turnup and the terminal point of said second element.

2. The pneumatic tire of claim 1 wherein the oblique angle with the equatorial plane is between 30° to 60°.

3. The pneumatic tire of claim 1 wherein the nonreinforced rubber element is pure rubber.

4. The pneumatic tire of claim 1 wherein the first element is outside the second element.

5. The pneumatic tire of claim 1 wherein the first element is inside the second element.

6. The pneumatic tire of claim 1 wherein the bead core, the rubber filler assembly and the inner and outer walls of the tire in the vicinity of the bead core and rubber filler assembly define a heel zone and wherein m defines the distance from a radially internal edge of the heel zone to the most external portion of the first element, and wherein H defines the distance from the radially internal edge of the heel zone to the most radially remote inner area of the carcass below the tread, and the ratio of $m/H$ is between 0.15 and 0.35.

7. The pneumatic tire of claim 6 wherein the ratio of $m/H$ is between 0.22 and 0.28.

8. The pneumatic tire of claim 1 wherein the bead core, the rubber filler assembly and the inner and outer walls of the tire in the vicinity of the bead core and rubber filler assembly define a heel zone and wherein $n$ defines the distance from a radially internal edge of the heel zone to the most externally situated portion of the second element, and wherein H defines the distance from the radially internal edge of the heel zone to the most radially remote area of the carcass below the tread, and the ratio of $n/H$ is between 0.35 and 0.95.

9. The pneumatic tire of claim 8 wherein the ratio of $n/H$ is between 0.62 and 0.68.

10. The pneumatic tire of claim 1 wherein the reinforced stranded rubber of the first element includes fibers selected from the group consisting of textile fibers, metallic fibers, glass fibers, fibers formed from petroleum derivatives, and fibers formed of Kevlar material.

11. The pneumatic tire of claim 1 wherein said first carcass ply includes textile reinforcing elements made of Kevlar material, said elements forming an angle of 15° to 60° with a line tangent to the bead core.

12. The pneumatic tire of claim 1 wherein said first carcass ply includes textile reinforcing elements made of a warp and weft fabric, one of the orientations of which forms an angle of approximately 45° with a line tangent to the bead core.

13. The pneumatic tire of claim 1 wherein said second ply is a second carcass ply passing from said tread along the outer wall side of said rubber filler assembly in substantially continuous contact with the outer wall portion of said filler assembly from said turnup to the terminal portion of said second element such that said first and second carcass plies form an enveloping skin-like cover along the inner and outer sidewalls of said filler assembly.

14. The pneumatic tire of claim 1 wherein said second ply has one terminal edge at said bead core and an opposite terminal edge intermediate the point of maximum thickness and the terminal point of said second filler element.

15. The pneumatic tire of claim 1 wherein said carcass includes a third carcass ply passing from said tread region along the inner wall side of said first carcass ply, said third carcass ply being turned around said bead core with a third ply turnup portion overlapping the outer wall of said filler assembly between the turnup of the first carcass ply and the mutual contact point of the first and second elements, said second carcass ply passing from said tread region along the outer wall side of said rubber filler assembly in substantially continuous contact with the outer wall side of the rubber filler assembly from the terminal point of said second element to the turnup of said third carcass ply and extending to said bead, said second carcass ply overlapping said third carcass ply at the outer wall side of said rubber filler assembly between the turnup of said third carcass ply and said bead.

* * * * *